(12) United States Patent
Williams (10) Patent No.: US 11,203,170 B2
(45) Date of Patent: Dec. 21, 2021

(54) INKJET PRINTED MOLDED NANOCOMPOSITE-INK OPTICAL-ELEMENT

(71) Applicant: Vadient Optics, LLC., Beaverton, OR (US)

(72) Inventor: George Williams, Portland, OR (US)

(73) Assignee: VADIENT OPTICS, LLC, Beaverton, OR (US)

( * ) Notice: Subject to any disclaimer, the term of this patent is extended or adjusted under 35 U.S.C. 154(b) by 0 days.

(21) Appl. No.: 15/151,301

(22) Filed: May 10, 2016

(65) Prior Publication Data

US 2017/0327413 A1 Nov. 16, 2017

(51) Int. Cl.
*B29D 11/00* (2006.01)
*B82Y 20/00* (2011.01)

(52) U.S. Cl.
CPC ........ *B29D 11/00355* (2013.01); *B29D 11/00* (2013.01); *B29D 11/00682* (2013.01); *B82Y 20/00* (2013.01)

(58) Field of Classification Search
CPC . C03C 17/00; G02B 3/0018; B29D 11/00355; B29D 11/00682

USPC .................................................. 427/162–169
See application file for complete search history.

(56) References Cited

U.S. PATENT DOCUMENTS 6,089,711 A * 7/2000 Blankenbecler ..... G02B 3/0087
351/159.02
2013/0279851 A1* 10/2013 Matsumoto ............ G02B 6/327
385/33
2015/0023643 A1* 1/2015 Chartoff .................... C08K 3/30
385/124

* cited by examiner

*Primary Examiner* — Elizabeth A Burkhart
(74) *Attorney, Agent, or Firm* — Alleman Hall Creasman & Tuttle LLP (57) ABSTRACT

A method of manufacturing a 3-dimensional variable refractive-index optical-element with surface figure, the method comprising: depositing a plurality of nanocomposite-inks comprising an organic-matrix with a nanoparticle filler dispersed within, and at least partially curing a portion of the nanocomposite-ink to form a nanocomposite slab that is at least semi-solid; transferring the nanocomposite slab to a press, the press having a die mold with at least a first surface figure; and actuating the press to compress the nanocomposite slab and impart the die mold's first surface figure onto the nanocomposite slab to form a nanocomposite optical-element.

19 Claims, 8 Drawing Sheets

FIG. 6B

INKJET PRINTED MOLDED NANOCOMPOSITE-INK OPTICAL-ELEMENT

TECHNICAL FIELD OF THE DISCLOSURE

The present disclosure relates in general to manufacture of optics. This application relates in particular to depositing and curing nanocomposite-inks on and within mold to manufacture freeform gradient refractive index optics (GRIN) and other 3D freeform dielectric structures.

BACKGROUND DISCUSSION

A variety of manufacturing techniques exist for manufacturing optics. Traditional techniques, still widely in use today, involve grinding and polishing of optics with abrasive particles. Glass blanks are created by grinding, molding, or machining glass to roughly obtain the same shape, slightly greater in size, of the desired final optic. The blank or multiple blanks are mounted to a top or bottom polishing block, the polishing blocks shaped matching the desired optic shape. The blocks are typically mechanized with the bottom block typically rotating and the top-block moving across the bottom-block with an actuated arm. Slurry comprising of abrasive particles such as silicon carbide, aluminum oxide, and finer cerium oxide and fluid is continually added. As the lens goes through several stages of polishing, the particle size is reduced, until the resultant shape and surface finish is obtained. Unless a single optic is blocked, this technique is generally limited to planar, convex, and concave surfaces on circularly symmetric optic.

Other known techniques, which allow more complex surfaces and shapes include diamond-disc shaping, CNC machining with single-point diamond shaping, glass molding, polymer molding and magneto rheological figuring (MRF).

This application relates to another approach.

SUMMARY OF THE DISCLOSURE

The present disclosure is directed inkjet printing a 3-dimensional variable refractive-index optical-element with surface figure. In one aspect the method comprises: depositing a plurality of nanocomposite-inks comprising an organic-matrix with a nanoparticle filler dispersed within, and at least partially curing a portion of the nanocomposite-ink to form a nanocomposite slab that is at least semi-solid; transferring the nanocomposite slab to a press, the press have a die mold with at least a first surface figure; and actuating the press to compress the nanocomposite slab imparting the die mold's first surface figure onto the nanocomposite slab to form a nanocomposite optical-element.

BRIEF DESCRIPTION OF THE DRAWINGS

The accompanying drawings, which are incorporated in and constitute a part of the specification, schematically illustrate embodiments of the present disclosure, and together with the general description given above and the detailed description of preferred methods and embodiment given below, serve to explain principles of the present disclosure.

DETAILED DESCRIPTION

Referring now to the drawings, wherein like components are designated by like reference numerals. Methods of manufacture and various embodiments of the present disclosure are described further herein below.

A method of manufacturing a 3-dimensional variable refractive-index optical-element with surface figure includes depositing a plurality of nanocomposite-inks comprising an organic-matrix with a nanoparticle filler dispersed within, and at least partially curing a portion of the nanocomposite-ink, to form a nanocomposite slab that is at least semi-solid; transferring the nanocomposite slab to a press, the press have a die mold with at least a first surface figure; and actuating the press to compress the nanocomposite slab imparting the die mold's first surface figure onto the nanocomposite slab to form a nanocomposite optical-element.

Figure 1A:
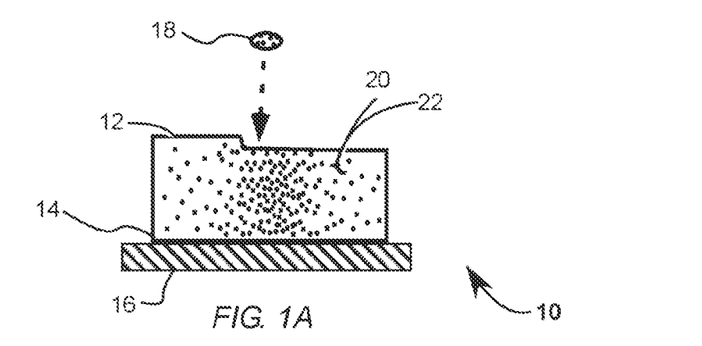
FIG. 1A is a cross-section view of a nanocomposite slab being form by depositing a plurality of nanocomposite-inks comprising an organic-matrix with a nanoparticle filler dispersed within, and at least partially curing the nanocomposite-ink to form the nanocomposite slab that is at least semi-solid.

Referring to FIG. 1A, a nanocomposite slab 10 exemplifies the deposition and curing process. Nanocomposite slab 10 is in-process with a first surface 12 and a second surface 14 on a substrate 16. First surface 18 is being build up by deposition of a plurality of nanocomposite-inks, including a nanocomposite-ink droplet 18. The plurality of nanocomposite-inks and nanocomposite slab 10 is comprised of an organic-matrix 20 with a nanoparticle filler 22 dispersed within. The nanocomposite slab is at least partially cured to its at least semi-solid. Here, nanoparticle filler 22 has a parabolic distribution within nanocomposite slab 10 that takes into account processing with a die mold that changes at least a surface of the nanocomposite slab and volumetric displacement to achieve an internally nonuniform refractive gradient and resulting overall optical power.

The organic-matrix is inkjet printable, optically clear, curable resin. Non-limiting examples of printable organic-matrix material for are cyanoethyl pullulan (CYELP), polyacrylate, hexanediol diacrylate (HDODA), polymethyl methacrylate (PMMA), diethylene glycol diacrylate (DEGDA), cellulose, and organic resins such as from the SU-8 series resists. The nanoparticle fillers are preferably sized sufficiently small with respect to light wavelengths, for those wavelengths intended for use, not to scatter the light. Some nonlimiting examples of nanoparticle fillers include Nonlimiting examples of suitable nanoparticle filler material include materials selected from selected from BeO, $Al_2O_3$, SiC, ZnO, $SiO_2$, ZnS, ZrO, $YVO_4$, $TiO_2$, $CuS_2$, CdSe, PbS, $TeO_2$, MgO, AlN, $LaF_3$, GaSbO, nano-Diamond, $ThF_4$, $HfO_2$—$Y_2O_3$, $Yb_2O_3$, $Dy_2O_3$, $ZrO_2$—$Y_2O_3$, $Si_3N_4$, $Y_2O_3$, KBr, $Ta_2O_5$, $HfO_2$, AlGaP, SiGe, GaAs, Au, Ag, LiF, $MoS_2$, or combinations thereof, including those with core, core/shell, and core/shell/ligand architectures. The nanoparticles can be selected for their material properties including mechanical, electrical, thermal, and optical properties including real, imaginary, and nonlinear properties. The nanoparticles are particularly useful for modifying the refractive-index within the optical-element can be modified by the nanocomposite-ink used. The refractive-index of a nanocomposite-ink will be the summation by percent volume of the optical properties of the organic-matrix, or organic-host, and the nanoparticle fillers. Concentration by volume of the nanoparticles to the organic-host can be about 0.25% to about 70% volume, depending on desired properties. The nanocomposite-ink can be tuned by the organic-matrix type, the nanoparticle filler type, and the concentration of the nanoparticle fillers in the organic-matrix.

An approximation of the refractive index can be calculated based on the summation by percent volume of the optical properties of the organic-matrix and the nanoparticles, although direct measurement is a preferred method of determining the refractive index for any given nanocomposite-ink formation. For a nanocomposite-ink with one nanoparticle type, the refractive index is given by the following equation:

$$n_{eff}(\lambda)=V\%_{NP} \times n_{NP}(\lambda)+V\%_{OM} \times n_{OM}(\lambda),$$

where $n_{eff}(\lambda)$ is the effective index of the nanocomposite-ink, $V\%_{NP}$ is the percent volume of the nanoparticles $n_{NP}(\lambda)$ is the refractive-index of the nanoparticles, $V\%_{OM}$ is the percent volume of the organic-matrix, and $n_{OM}(\lambda)$ is the refractive-index of the organic-matrix. Additionally, nanoparticles can be added and percent volume and refractive-index included in the equation.

In general, the nanocomposite-inks loaded with the nanoparticles will have a volume proportional increase of refractive-index. For instance, a nanocomposite-ink with nanoparticles that have a high-index relative to the organic-matrix will have increased refractive-index with increased nanoparticle concentration. Similarly, a nanocomposite-ink with a low-index nanoparticle, for instance a hollow buckeyball, comprised mostly of air, with an optical refractive index (n) of n=1, results in a nanocomposite-ink with a refractive index lower than the organic-matrix.

Figure 1B:
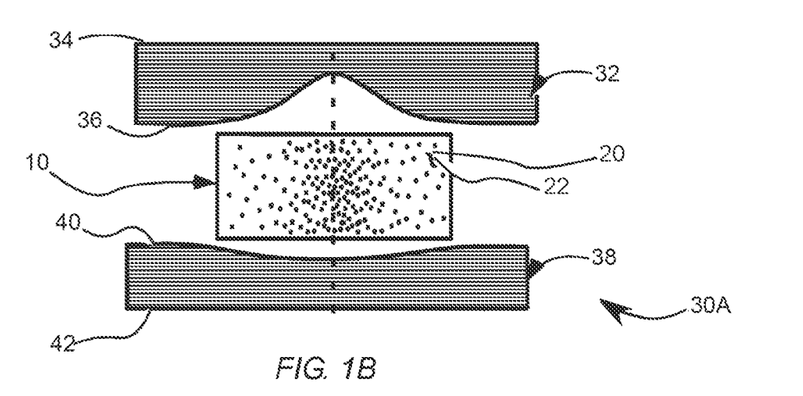
FIG. 1B is a cross-section view of the nanocomposite slab within a press having a die mold with a first surface figure and a second surface figure.

Referring to FIG. 1B a die mold 30A has the surface figure to transfer to the nanocomposite slab. Here, nanocomposite slab 10 is removed from its substrate and into a press with the die mold, although in other embodiments the substrate is not removed and becomes part of the finish nanocomposite optical-element. Here, the die mold has top die 32 and a bottom die mold 38. Die mold 32 has a first surface 34 and an aspheric second surface 36. Die mold 38 has a spherical first surface 40 and a second surface 42. Aspheric second surface 36 and spherical first surface 40 are have optical quality surface finish.

Figure 1C:
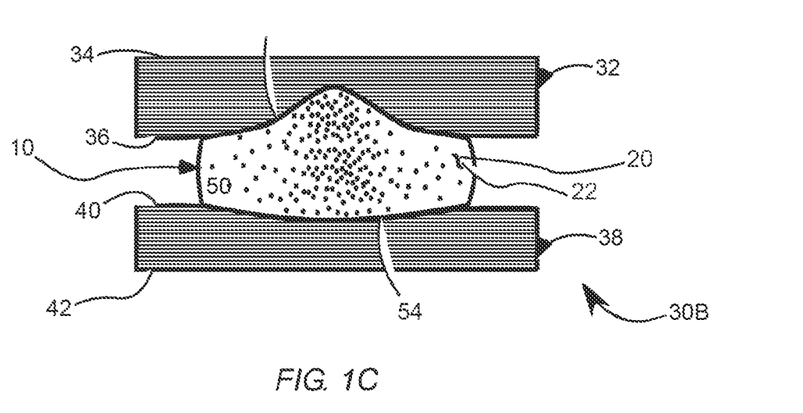
FIG. 1C is a cross-section view of a nanocomposite optical-element formed by actuating the press to impart the first surface figure and the second surface figure of the die mold.

Referring to FIG. 1C, a compressed die mold 30B imparts the negative of aspheric second surface 36 and spherical first surface 40 onto nanocomposite slab 10 to form an optical-element 50. Optical-element 50 has a first aspheric surface 52 and second spherical surface 54.

A preferred method of manufacture for the optical-element is by inkjet printing technology. Depending on the deposition process, the plurality of complex-dielectric-inks have viscosities of about 10 cP or less, producing droplets from about 0.1 pl to about 100 pl. Interrupted continuous flow heads break up a continuous ejection out a nozzle with resonant application of a force perpendicular to the flow resulting in a repeatable, predictable stream of droplets, which can range from about 1 pl to 100 pl making use of fluids with viscosities of 200 cP or less. Droplets that are not required are deflected, using air impingement or electrostatic charge selectively applied, into a recycling channel alongside the trajectory of the droplets to be used. The nozzles should be preferably located in proximity to the substrate on which the nanocomposite-ink is being printed, dependent on the deposition accuracy required. For precise deposition, the printhead should be within a centimeter or less of the substrate. Varying concentrations of nanoparticles throughout the printed layers, droplet-by-droplet, or layer-by-layer, throughout the volume of the nanocomposite slab, 3-dimensional dielectric property patterns are created.

Figure 2A:
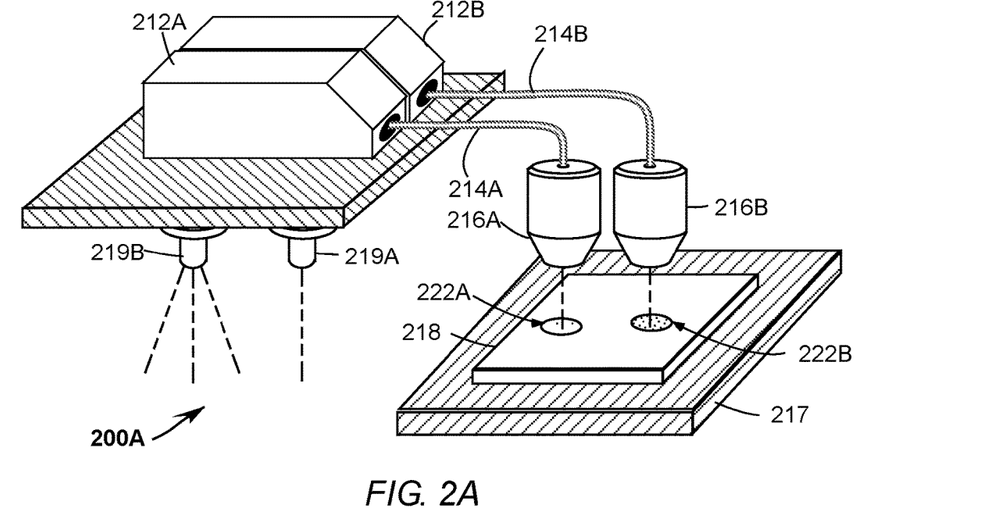
FIG. 2A is a perspective view of an inkjet printing apparatus.

Referring to FIG. 2A, an inkjet printer 200 exemplifies one nonlimiting printing apparatus. Inkjet printer 20 is simplified for explanatory purposes. Printing apparatus 20 has a reservoir 212A and a reservoir 212B that hold a nanocomposite-ink 222A and nanocomposite-ink 222B, respectively. Reservoirs 222A and 222B provide a printhead 216A and a printhead 216B with nanocomposite-ink 222A and 222B via a feed-line 214A and 214B, respectively. Printheads 216A and 216B deposit nanocomposite-ink 222A and 222B, on substrate 218 at particular voxels, thereby forming a nanocomposite structure, such as the nanocomposite slab of the present disclosure. Voxels refer to positions in three-dimensional space. A stage 217 positions a substrate 218, with respect to the printing-heads, for deposition of the nanocomposite-inks at particular voxels.

In general, substrate 218 can be, or be made, from the group comprising plastics, glasses, metals, ceramics, organic resins. The substrate can be a functional component such as an optic including lenses, mirrors, or waveguides. The substrate can be a mold, including the die mold. Alternatively, the substrate can be a functional component such as a light source, including lamps, LEDS and lasers, or the substrate can be a wafer including wafers with integrated electronics. For applications in which the substrate. In applications where the substrate is an optic the nanocomposite distribution can correct an aspect of the substrate. Alternatively, the substrate may be a mold material with anti-sticking properties, allowing removal of the optical-element from the mold and transfer into the die mold, or be the die mold itself.

For those nanocomposite-inks that are photo-curable, a photoinitiator is incorporated within the nanocomposite-ink. The substrate 218 can be positioned with respect to a radiation source 219A for selective-curing of the nanocomposite-ink, at voxels. Selective-curing refers to localized radiation about voxels, activating the organic-matrix. Activation of the organic-matrix solidifies the nanocomposite-ink thereby forming the nanocomposite. Selective-curing means zero-curing, partial-curing, or fully-curing, which respectively means not solidifying, partially solidifying, or fully solidifying the nanocomposite-ink. Another radiation source 219B flood cures the nanocomposite-ink on the substrate. Flood curing is desirable when the all the nanocomposite-ink needs to be partially or fully cured. The radiation source can be any optical source emitting electromagnetic radiation within the absorbance spectrum of the photoinitiators. In some embodiments the radiation source is either spectrally tunable or otherwise a plurality of optical sources are used. The optical sources can be broadband emission sources or spectrally discrete. Suitable optical sources include filament based sources, flash lamps, light emitting diodes (LED), laser diodes (LD), lasers, or combinations thereof.

The photoinitiator determines the degree of polymerization of the nanocomposite-ink under a given photo-dosage. Within any of the plurality of nanocomposite-inks, the photoinitiator can vary by the material type and concentration. The photoinitiator characteristics determine, in part, the depth dependent spectral absorbance and degree of polymerization for a given dosage of electromagnetic radiation by the optical source. High resolution spatial control can be accomplished using a plurality of photoinitiators curable at different spectral bandwidths and other such methods such as disclosed in U.S. patent application Ser. No. 15/099,403, assigned to the assignee of the current disclosure and hereby incorporated by reference in its entirety.

Figure 2B:
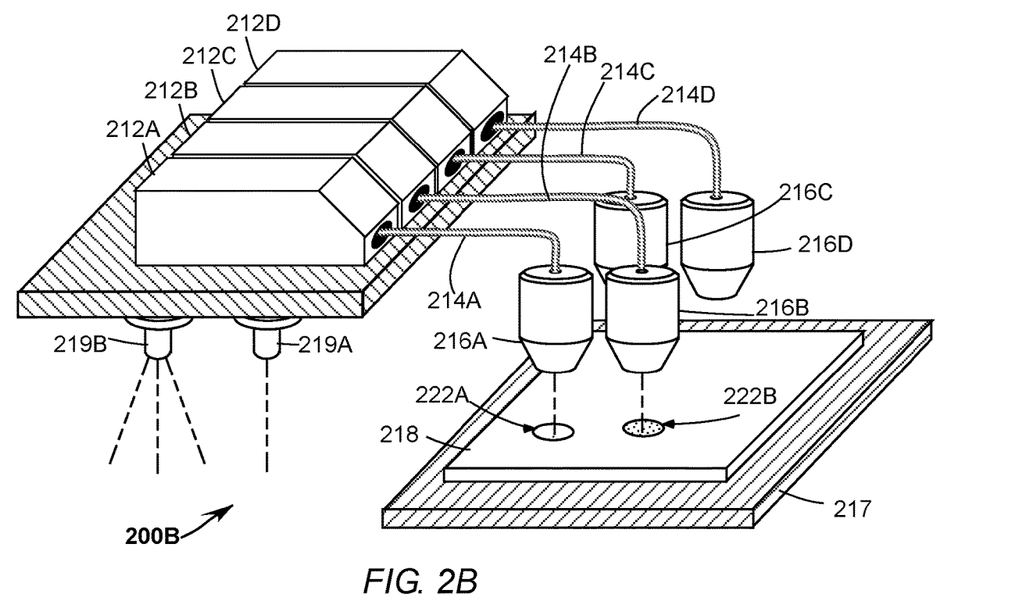
FIG. 2B is a perspective view of an inkjet printing apparatus with four printheads.

FIG. 2B illustrate printing apparatus 20 shown in FIG. 2A with addition of a reservoir 212C and 212D, holding a nanocomposite-ink 222C and 222D, a feed-line 214C and 214D, and a printing head 216C and 216D. The additional printing heads provide additional nanocomposite-ink different from the nanocomposite-ink in other printing heads. For instance, one of the reservoirs can hold one of the plurality of nanocomposite-inks with one concentration of the nanoparticle fillers, another can hold the nanocomposite-ink with a different concentration of the nanoparticle fillers, yet another can hold the nanocomposite-ink with a different type of the nanoparticle fillers, last one can hold an organic-matrix material without the nanoparticle fillers. The nanoparticle fillers and the organic-host can be chosen for other properties such as dielectric strength, thermal conductivity, electrical conductivity, coefficient of thermal expansion, or mechanical stability. Further, reservoirs can isolate the nanoparticle fillers and the organic-host and mix on demand for various nanoparticle fillers concentrations from any one of the printing heads.

Figure 2C:
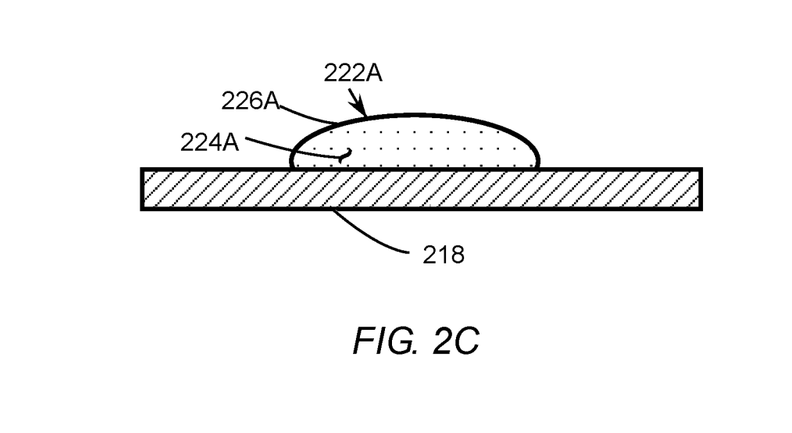
FIG. 2C is a cross-section view of a droplet of the nanocomposite ink being deposited on a substrate.

FIG. 2C illustrates further detail of the deposition of the nanocomposite-ink shown in FIGS. 2A and 2B. Nanocomposite-ink 222A, deposited on substrate 218 is bound by a nanocomposite-air interface 226A. The nanocomposite-ink comprises the organic-matrix with dispersed nanoparticle fillers 224A throughout the organic-matrix.

Figure 2D:
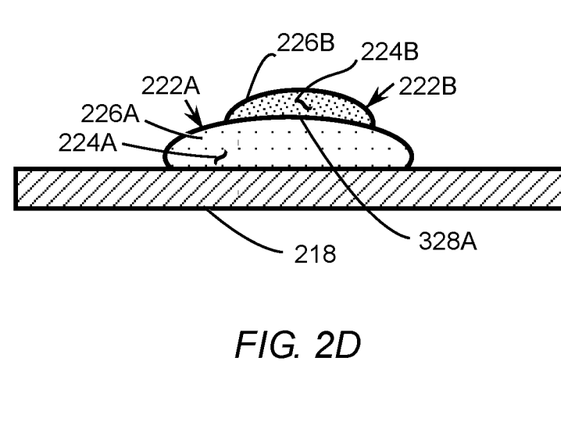
FIG. 2D is a cross-section view of that shown in FIG. 2C with an additional droplet of nanocomposite-ink.

FIG. 2D schematically illustrates that shown in FIG. 2C with an additional deposit of a nanocomposite-ink 222B at a voxel above the voxel of nanocomposite-ink 222A. Here, nanocomposite-ink 222B is shown after deposition, characterized by a dispersed nanoparticle fillers 226B, an ink-ink interface 228A (where mixing between nanoparticle-inks has not yet occurred), and an air-ink interface 226B.

Figure 2E:
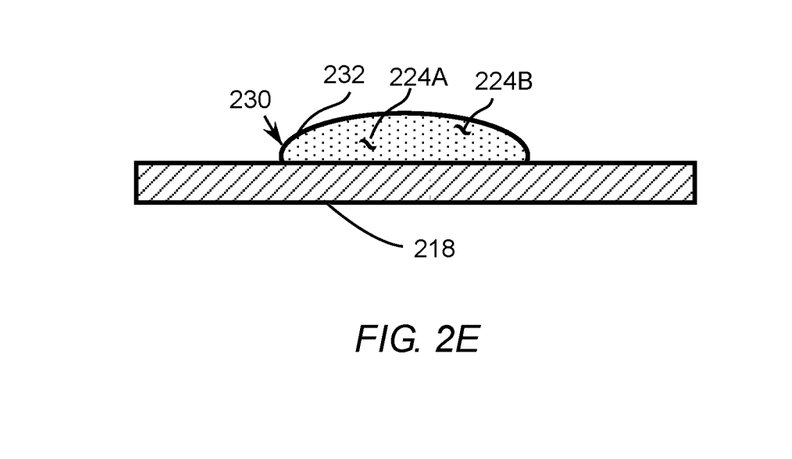
FIG. 2E is a cross-section view of that shown in FIG. 2D, wherein no curing was performed before deposition of the additional droplet.

FIG. 2E schematically illustrates that shown in FIG. 2D, wherein the selective-curing of nanocomposite-ink 222A before deposition of nanocomposite-ink 222B was zero-curing. A nanocomposite-ink 230 is the resultant mixture of uncured nanocomposite 222A and 222B. Nanocomposite-ink 230 is characterized by an air-ink interface 232 and nanoparticle fillers 224A and 224B dispersed within. A refractive-gradient between the top and bottom of nanocomposite-ink 230 depends on convective mixing resulting from relative size, velocities, and nanoparticle filler concentrations between the nanocomposite-inks, any partial-curing of nanocomposite-ink 222A drop before deposition of nanocomposite-ink 222B, the temperature of the substrate, and time allowed for diffusion of nanoparticle fillers from nanocomposite-inks 222A and 222B, before additional partial-curing of the nanocomposite-inks.

Figure 2F:
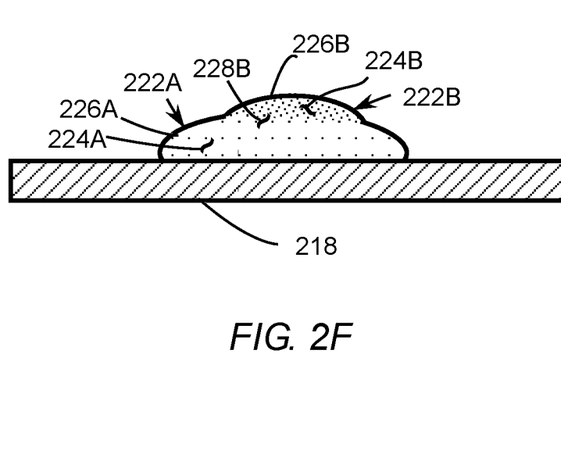
FIG. 2F is a cross-section view of that shown in FIG. 2D, wherein partial curing occurred before deposition of the additional droplet.

FIG. 2F schematically illustrates the nanocomposite structure of that shown in FIG. 2D wherein nanocomposite 222A was partially cured. Here, partial-cure of nanocomposite 222A results in gradient-area 222B between nanocomposite 222A and 222B. The extent of gradient-area 222B depends on the selective-cure of nanocomposite-ink 222A. Zero-curing allows mixture of the nanocomposite-inks as exemplified in FIG. 2E. Partial-curing allows diffusion in a limited gradient area 228A as exemplified in FIG. 2F. Fully-curing allows little diffusion and results in a substantially ink-ink interface 228A as exemplified in FIG. 2D. In addition to controlling gradient-areas, partial-curing before subsequent deposition reduces stress and strain in the resultant optical-element.

Figure 2G:
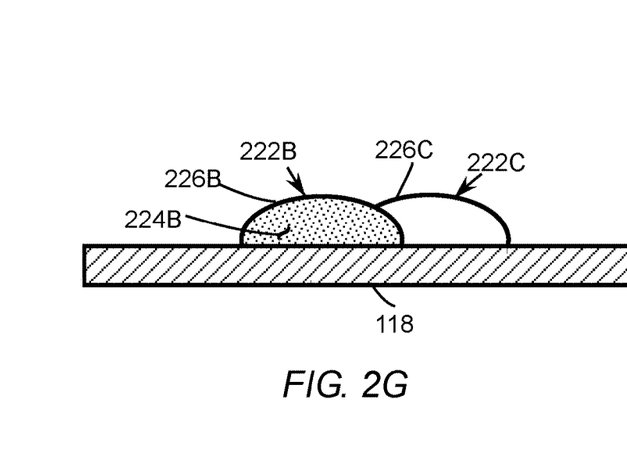
FIG. 2G is a cross-section view of a nanocomposite side-by-side deposition.

FIG. 2G schematically illustrates a nanocomposite structure similar to that shown in 2D where the nanocomposite-ink is deposited side-by-side. Here, nanocomposite-ink 222B with nanoparticle fillers 224B and an ink-air interface 226B is deposited along the side of a nanocomposite-ink 222C. Nanocomposite-ink 222C has no nanoparticle fillers bound by an air-interface 226C.

Figure 2H:
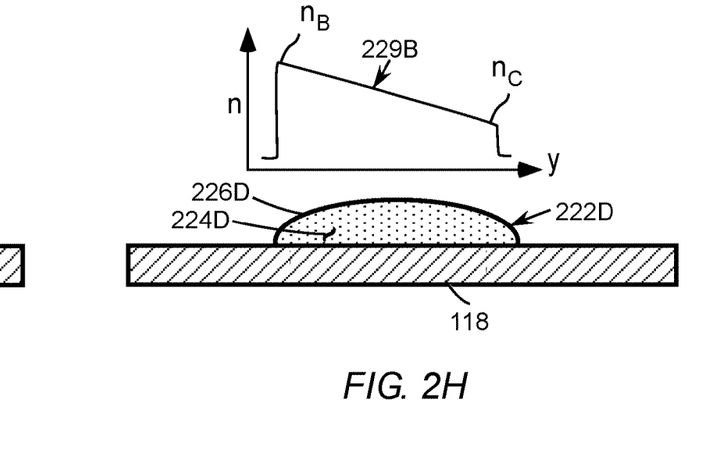
FIG. 2H is a cross-section view of a side-by-side gradient nanocomposite structure.

FIG. 2H schematically illustrates a nanocomposite structure similar to that shown in FIG. 2G, where nanocomposite-ink 222B has mixed with nanocomposite 222C resulting in a gradient nanocomposite 222D. Here nanocomposite 222D is bounded by an ink-air interface 226D, has a nanoparticle filler 224D, the same nanoparticle fillers as nanocomposite-ink 222B, distributed according to a refractive-gradient profile 229B. The gradient is a result of mixture of the nanocomposites where the partial-curing of nanocomposite 222B was minimal and aforementioned convective mixing and time was allowed before further partial-curing. A refractive-gradient profile 229B is characterized by a high refractive-index nB, the high refractive-index due to higher concentration of nanoparticles 224D, the refractive-gradient's refractive-index slowly and smoothly transitioning in the y-direction to a low refractive-index nC, the low refractive-index due to the low concentration of nanoparticles 224D.

Figure 2I:
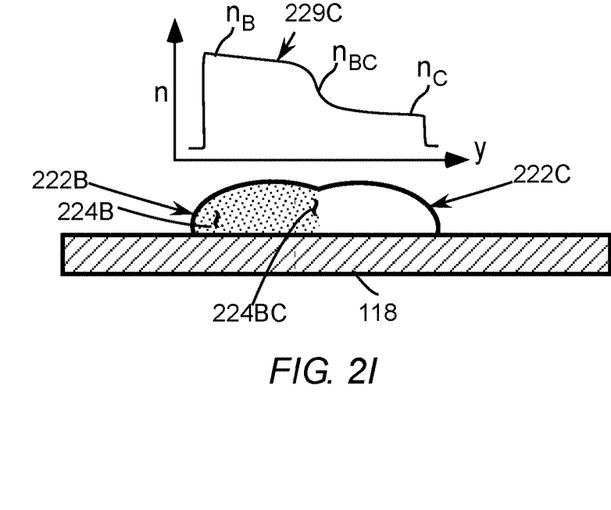
FIG. 2I is a cross-section view similar to that shown in FIG. 2H wherein partial curing occurred before deposition of additional nanocomposite-ink droplets.

FIG. 2I schematically illustrates the nanocomposite structure shown in FIG. 2G, where nanocomposite-ink 222B has been partially-cured before deposition of nanocomposite-ink 222C. Here partial-cure of nanocomposite-ink 222B, results in limited mixing of nanocomposite-ink 222C at an interface 224AB, resulting in a refractive-gradient 229C. Refractive-gradient profile 229C is characterized by high refractive-index nB, the high refractive-index due to higher concentration of nanoparticles 224D, the refractive-gradient's refractive-index unchanging in the y-direction until quickly transitioning to low refractive index nB at former interface 224AB. Alternatively, refractive-gradient profile 229C could be produced without partial-curing of nanocomposite-ink 222B, before deposition of nanocomposite 222C, by limiting the aforementioned mixing factors, such as controlling nanocomposite-ink deposition velocities, and limiting diffusion temperature control of the substrate, and curing the deposited nanocomposite-inks within a controlled time.

Figure 2J:
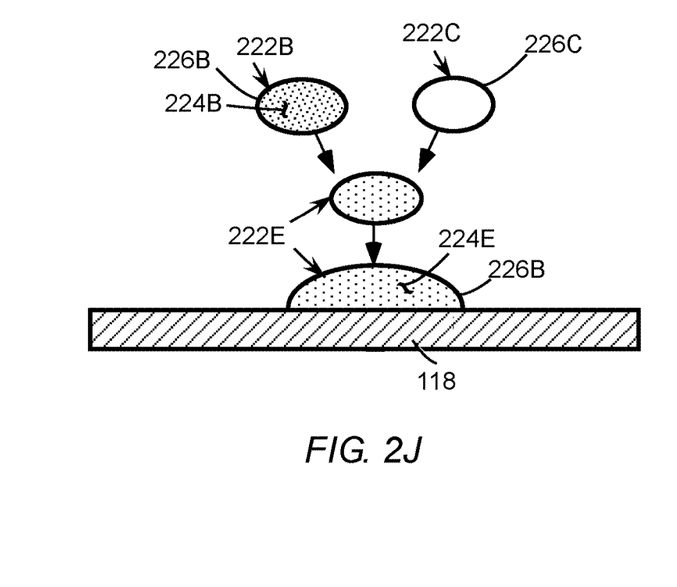
FIG. 2J is a cross-section view of nanocomposite-ink mixing in air subsequent to deposition on the substrate.

FIG. 2J schematically illustrates another nanocomposite-ink mixing method. A nanocomposite-ink 226B and a nanocomposite-ink 226C are deposited such that the respective printing heads are aligned to cause the nanocomposite-ink to mix in air creating a nanocomposite-ink 222E. Nanocomposite-ink 222E, then deposits, mixed, onto substrate 118 with a nanoparticle fillers 224E bounded by an ink-air interface 226B.

Figure 3:
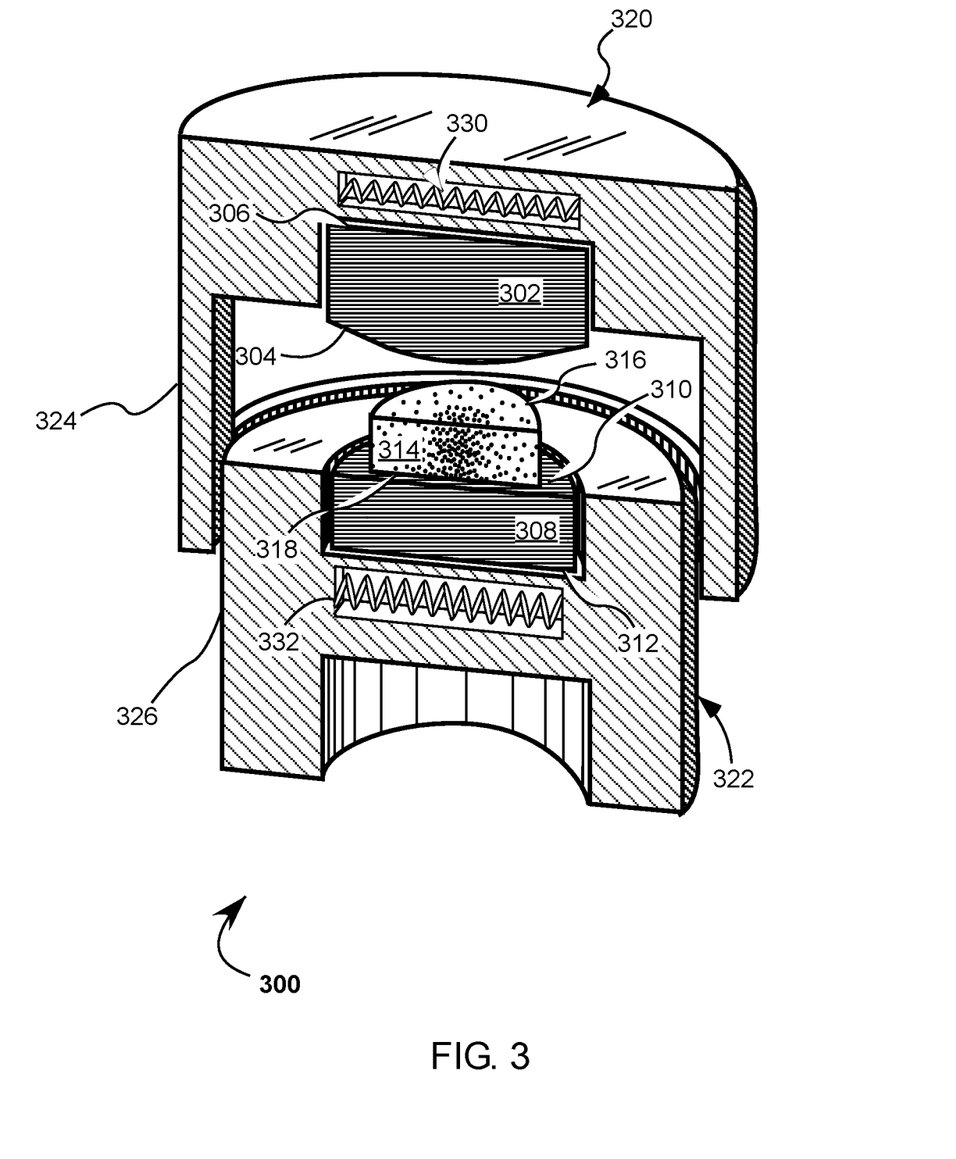
FIG. 3 is a perspective view, partly in cross-section of a press, a die mold, and a nanocomposite slab.

Referring to FIG. 3, a press 300 has a die mold with an upper die 302 and lower die 308 with a nanocomposite slab 314 positioned between. Nanocomposite slab 314 has a first surface 316 and second surface 318. The press has a first and second cavity to precisely hold the upper die and lower respectively. Upper die 302 has a first surface 306 and a spherical second surface 304, second surface 304 to contact and impart the die's surface figure onto the nanocomposite slab's first surface 316. Lower die 308 has a planar first surface 310 and a second surface 312, first surface 310 to contact and impart the die's surface figure onto the nanocomposite slab. The press has an upper section 320 that holds upper die 302 and a lower section 322 that holds lower die 308. Upper section 320 has a guide member 324 that wraps around the lower section's sidewall 326 to ensure positional accuracy of the die mold during compression.

Here, upper section 320 and lower section 322 have a thermal element 330 and a thermal element 332, respectively. While the ambient temperature conditions can be controlled with apparatus external to the press, the thermal elements allow temperature control of the upper and lower sections of the press, and the die mold itself. The temperature can be elevated to aide in the compression or molding process. Preferably the elevated temperature is lower than the average glass transition temperature of the nanocomposite slab.

The methods of manufacturing the 3-dimensional variable refractive-index optical-element with surface figure is particularly well suited for high volume manufacturing. Another method of present disclosure includes: providing a carrier element compatible with a first die mold; depositing a plurality of nanocomposite-inks comprising of an organic-matrix with a nanoparticle filler dispersed within, and at least partially curing a portion of the plurality of nanocomposite-ink to form a nanocomposite slab that is at least semi-solid; and bringing a first die mold into contact with the nanocomposite slab to impart the first die mold's surface onto the nanocomposite slab to form a nanocomposite optical-element.

Figure 4:
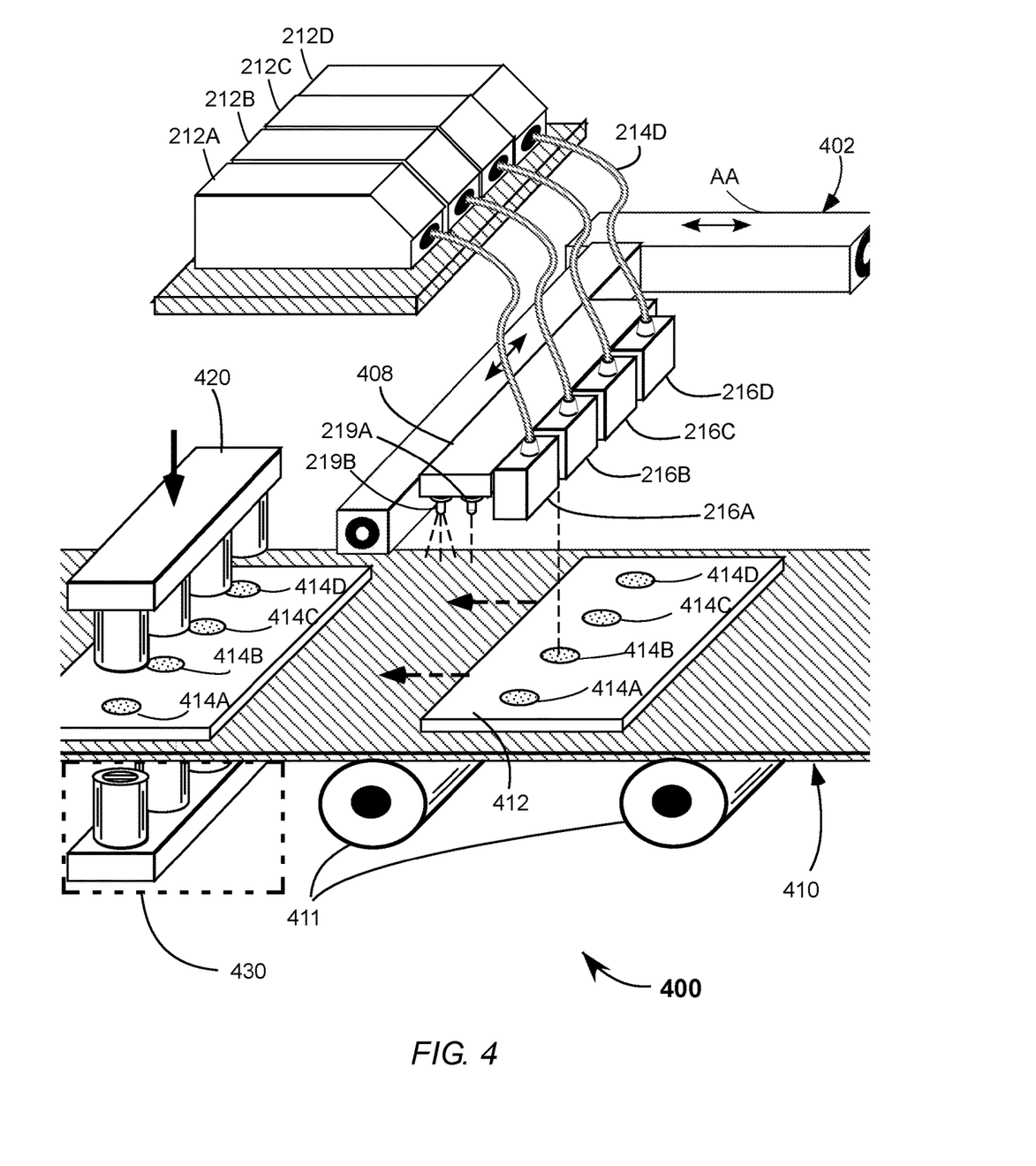
FIG. 4 is a perspective view of a press that holds a die mold to impart surface figure onto a nanocomposite slab.

Referring to FIG. 4, a printing apparatus 400 has that shown in FIG. 2B additionally comprising an x-y stage 402, a conveyor belt 410, and press 420. x-y stage 402 has a linear stage 404 and a linear stage 406 that carries printheads 216A, 216B, 216C, and 216D via a mounting bar 408. Conveyor belt 410 is supported by a plurality of casters 411 and delivers a carrier element 412 under the printheads to deposit a plurality of nanocomposite slabs onto carrier element 412. Here, a nanocomposite slab 414A, 414B, 414C, and 414D are shown in transition to a die mold 406A, 406B, 406C, and 406D, respectively. The die molds impart their surface onto the nanocomposite slab forming the nanocomposite optical-elements with surface figure.

Here, carrier element 412 is a plate with positions for each of the respective nanocomposite optical-elements. The carrier element can contain cavities that can include both surface figure and other mechanical features. The carrier element can contain components such an optical component as aforementioned. In addition, the carrier element can be treated with a chemical coating or flexible membrane. For instance, the carrier element can be coated with a releasing agent. In some embodiments the carrier element is a thin flexible membrane that carries the optical-element. The thin flexible membrane can be coated with a spectral coating and become part of the optical element, or allow easy release. When a thin flexible membrane is used a second surface figure can be imparted onto the nanocomposite slab via an optional lower press 430.

Figure 5A:
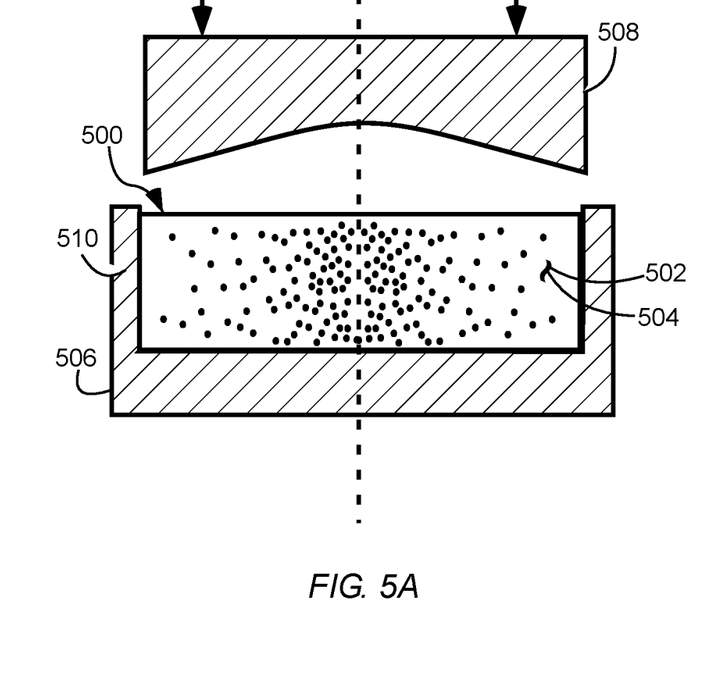
FIG. 5A is a cross-section view of a nanocomposite slab in a lower die press with side walls.
Figure 5B:
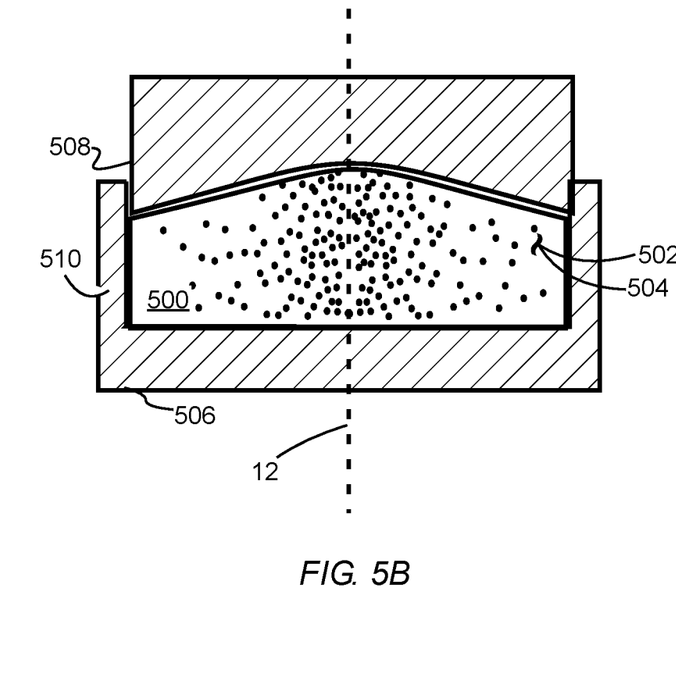
FIG. 5B is a cross-section view of the nanocomposite slab shown in FIG. 5A being pressed.

Referring to FIG. 5A and FIG. 5B, a nanocomposite slab 500 is in a lower die press 506 with an upper die press 508 compressing the nanocomposite slab. Nanocomposite slab 500 has a nanoparticle filler 502 dispersed within an organic-matrix 504. The upper die has a spherical surface 509 to impart on the nanocomposite slab. Here, lower die press 500 has a side wall 510 that prevents material displacement along the edge of the nanocomposite slab during compression. Nanocomposite slab 500 has a nanoparticle distribution that accounts for the sidewall retention.

The nanoparticle fillers are deposited in a pattern taking into account the surface figure of the die mold and displacement material to achieve the intended nanocomposite optical-element. In some embodiment the nanoparticle filter is distributed such that optical aberration from the surface figure is corrected for low aberration optical delivery and imaging applications. For instance, the nanoparticles can be distributed to correct aberrations described by the 5 seidel aberration, Zernike polynomials, or other wavefront error including chromatic error. Alternatively, the distribution can be made to enhance refractive scattering and uniformity for general light delivery in illumination designs.

Figure 6A:
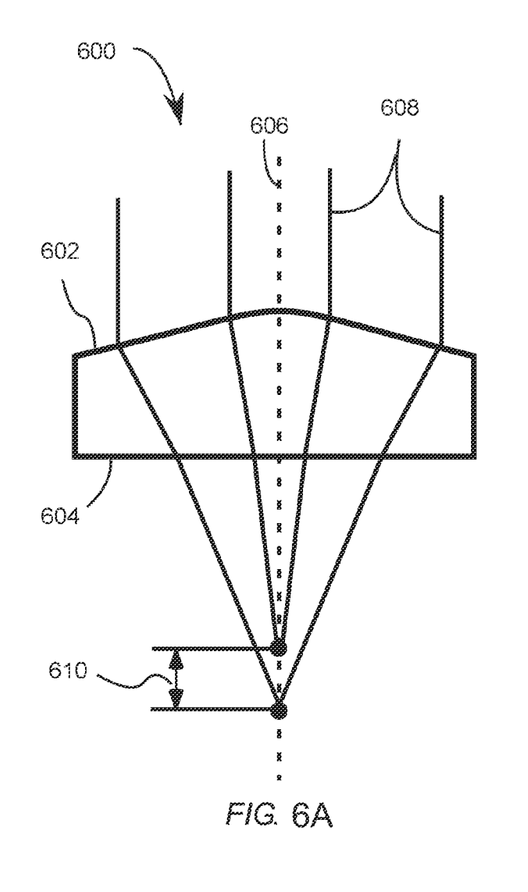
FIG. 6A is a cross-section view of a homogenous optical-element with a spherical surface and an aberrated focal.
Figure 6B:
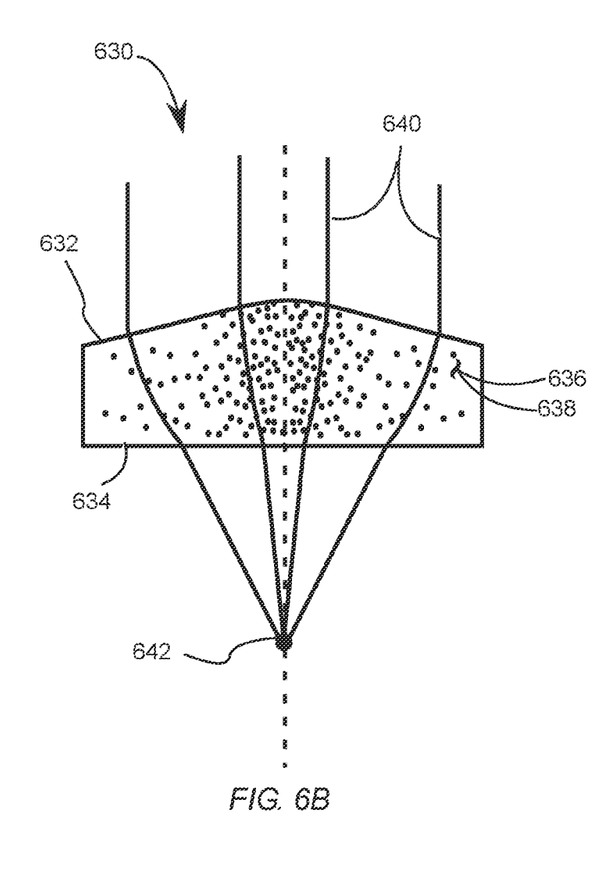
FIG. 6B is a cross-section view of a nanocomposite optical-element with the same spherical surface of the optical-element shown in FIG. 6A with a corrected focal spot.

Referring to FIG. 6A, an optical-element 600 is a homogenous glass optic with a spherical first surface 602 and a plano second surface 604. An optical ray fan 608, symmetric about an optical axis 606 refracts at first surface 602 and second surface 604 to an aberrated focal point 610 due to coma. Referring to FIG. 6B, a nanocomposite optical-element 630 has a spherical first surface 632 and a plano second surface 634 that are the same figure as first surface 602 and second surface 604, respectively. Nanocomposite optical element 630 has a nanoparticle filler 636 dispersed within an organic-matrix 638 in a distribution that corrects coma. Here, a ray fan 640 refracts at first surface 632, then continuously refracts through the refractive gradient to second surface 634, then focuses at a focal spot 642.

From the description of the present invention provided herein one skilled in the art can practice the methods in accordance with the present disclosure. Those skilled in the art to which the present invention pertains will recognize that while above-described embodiments and method of manufacture are exemplified using particular materials others may be combined using these embodiments without departing from the spirit and scope of the present invention. Although some of the embodiments explained above have certain symmetry one skilled in the art will recognize that such symmetry is not a requirement and cylindrical and anamorphic optical-elements can be manufactured with the disclosed techniques.

In summary, the present invention is described above in terms of particular embodiments. The invention, however, is not limited to the embodiments described and depicted herein. Rather, the invention is limited only by the claims appended hereto.

What is claimed is:

1. A method of manufacturing a variable refractive-index optical element with surface figure, the method comprising:
   providing a die mold configured to form the optical element by deformation of a slab that includes volumetric displacement of the slab, the die mold including at least a first surface figure;
   calculating, based on the volumetric displacement, a three-dimensionally varying refractive index for the slab, such that the deformation of the slab imparts predetermined optical power to the optical element;
   depositing a plurality of nanocomposite inks comprising an organic matrix with a nanoparticle filler dispersed within the organic matrix, and at least partially curing the plurality of nanocomposite inks to form the slab in solid or semi-solid form; and
   compressing the slab in the die mold to form the optical element and impart at least the first surface figure to the optical element.

2. The method of claim 1, wherein the slab has nanoparticle filler concentration that varies in 3-dimensions.

3. The method of claim 1, further comprising fully curing the optical element.

4. The method of claim 1, wherein the slab is fully cured before compressing.

5. The method of claim 1, wherein the slab has a first surface and second surface that is planar, cylindrical, acylindrical, spherical, aspherical, freeform, or a combination thereof.

6. The method of claim 1, wherein the compression of the slab is performed at an elevated temperature.

7. The method of claim 6, wherein the elevated temperature is lower than the average glass transition temperature of the slab.

8. The method of claim 1, wherein the slab is deposited on a substrate.

9. The method of claim 8, wherein the substrate is an optical element.

10. The method of claim 8, wherein the substrate is removed before compression.

11. The method of claim 1, wherein the die mold is a multi-cavity mold.

12. The method of claim 1, wherein the die mold further comprises a second surface figure, the compression imparting both the first surface figure and the second surface figure onto the slab.

13. The method of claim 1, wherein the at least one of the plurality of nanocomposite inks includes an elastomeric polymer.

14. The method of claim 1, wherein the at least one of the plurality of nanocomposite inks includes a thermoplastic polymer.

15. A method of manufacturing a variable refractive-index optical element with surface figure, the method comprising:
    providing a first die mold configured to form the optical element by deformation of a slab that includes volumetric displacement of the slab;
    providing a carrier element compatible with the first die mold;
    calculating, based on the volumetric displacement, a three-dimensionally varying refractive index for the slab, such that the deformation of the slab imparts predetermined optical power to the optical element;
    depositing a plurality of nanocomposite inks comprising an organic matrix with a nanoparticle filler dispersed within the organic matrix, and at least partially curing the plurality of nanocomposite inks to form the slab in solid or semi-solid form; and
    compressing the slab in contact with the first die mold to impart a surface of the first die mold to the optical element.

16. The method of claim 15, further comprising providing a second die mold, compatible with the carrier element and imparting a surface of the second die mold onto the slab.

17. The method of claim 15, wherein the carrier element is rigid with cavities for carrying the slab.

18. The method of claim 15, wherein the carrier element holds components that receive the slab.

19. The method of claim 15 wherein the carrier element comprises a flexible membrane.

* * * * *

UNITED STATES PATENT AND TRADEMARK OFFICE
CERTIFICATE OF CORRECTION

PATENT NO. : 11,203,170 B2
APPLICATION NO. : 15/151301
DATED : December 21, 2021
INVENTOR(S) : George Williams It is certified that error appears in the above-identified patent and that said Letters Patent is hereby corrected as shown below:

In the Claims

In Column 10, actual Line 11, Claim 13, immediately after the word wherein, delete "the"
In Column 10, actual Line 14, Claim 14, immediately after the word wherein, delete "the"

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*